United States Patent [19]

Imai et al.

[11] Patent Number: 5,079,425

[45] Date of Patent: Jan. 7, 1992

[54] RADIATION DETECTING ELEMENT

[75] Inventors: Takahiro Imai; Tetsuo Yashiki; Naoji Fujimori, all of Itami, Japan

[73] Assignee: Sumitomo Electric Industries, Ltd., Osaka, Japan

[21] Appl. No.: 639,085

[22] Filed: Jan. 9, 1991

[30] Foreign Application Priority Data

Jan. 10, 1990 [JP] Japan .................... 2-3810

[51] Int. Cl.[5] .................................. G01T 1/24
[52] U.S. Cl. .................... 250/370.01; 357/29
[58] Field of Search ............. 250/370.01, 370.12; 357/29; 437/3, 4

[56] References Cited

U.S. PATENT DOCUMENTS

| | | | |
|---|---|---|---|
| 3,665,193 | 5/1972 | Kozlov et al. | 250/370.01 |
| 3,668,400 | 6/1972 | Kozlov | 250/370.01 |
| 4,045,674 | 8/1977 | Vermeulen | 250/370.01 |
| 4,833,328 | 5/1989 | Prins et al. | 250/370.01 |

*Primary Examiner*—Edward P. Westin
*Assistant Examiner*—Richard Hanig
*Attorney, Agent, or Firm*—Cushman, Darby & Cushman

[57] ABSTRACT

A radiation detecting element comprising a pair of electrode and a semiconductor layer interposed between said pair of electrodes wherein said semiconductor layer comprises a polycrystal diamond having no grain boundary in a direction in which a voltage is applied, and an electric current flows through said semiconductor layer from one electrode to the other without crossing a grain boundary, which element has high sensitivity and a high response speed.

8 Claims, 3 Drawing Sheets

RADIATION DETECTING ELEMENT

BACKGROUND OF THE INVENTION

1. Field of the Invention

The present invention relates to a radiation detecting element. More particularly, the present invention relates to an element for detecting α-ray, β-ray, γ-ray, X-ray, neutron or UV light which is used in, for example, high energy physical experiments.

2. Description of the Related Art

Recently, as radiation detectors, semiconductor detectors comprising a semiconductor such as silicon are increasingly used in place of detectors which require a large space such as a gas drift chamber. With the semiconductor detector comprising silicon, a reverse voltage is applied to a p-n junction of silicon, and incidence of radiation generates electron-hole pairs, whereby, a current flows. The semiconductor detector has good linearity between the radiation energy and the detected current.

However, since silicon or germanium is used in a detecting part, saturation mobility of carriers is small, for example, saturation electron mobility in silicon is $1 \times 10^7$ cm/sec., so that a detecting element has a low response speed. Highly pure silicon has a resistivity of in a order of $10^5$ Ω.cm, and germanium has a lower resistivity. When a current flows through the element, since a dark current is very larger. Therefore, a p-n junction is formed and a voltage is applied in a reverse bias. However, in this way, a radiation is detected only in a depleted layer having a thickness of several ten μm. Then, the element tends to have an insufficient detecting sensitivity in view of a collision cross section.

When a semiconductor in the detecting part of the radiation detecting element comprises single crystal diamond, the element has a high response speed and good sensitivity since the carriers have very large mobility in the single crystal diamond (e.g. $2.5 \times 10^7$ cm/sec.) (see Japanese Patent Kokai Publication No. 198780/1987).

Recently, there is developed a method for synthesizing a film-form polycrystal diamond from a vapor phase. By using this method, it has been tried to produce a radiation detecting element comprising the polycrystal diamond, but no good result has been obtained, since the polycrystal diamond has very low sensitivity to the radiation.

The reason why the polycrystal diamond has very low sensitivity to radiation is that grain boundaries present between adjacent particles interfere movement of the electrical carriers generated by the radiation. Whenever the carrier passes the grain boundary, its speed is greatly decreased so that an effective mobility of the carrier is made small. Therefore, performances of the radiation detecting element comprising the polycrystal diamond are only as good as those of the semiconductor detector.

SUMMARY OF THE INVENTION

An object of the present invention is to provide a highly sensitive radiation detecting element comprising polycrystal diamond.

According to the present invention, there is provided a radiation detecting element comprising a pair of electrode and a semiconductor layer interposed between said pair of electrodes wherein said semiconductor layer comprises a polycrystal diamond having no grain boundary in a direction in which a voltage is applied, and an electric current flows through said semiconductor layer from one electrode to the other without crossing a grain boundary.

DETAILED DESCRIPTION OF THE DRAWINGS

Figure 1:
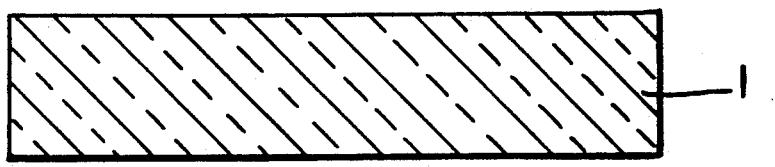
FIG. 1 is a cross section of a substrate.

In the polycrystal diamond to be used in the radiation detecting element, diamond particles in the crystal have large particle sizes, and each particle grows in a pillar form in a direction of a crystal growth so that no grain boundary is formed in this direction.

A pair of electrodes are attached to the diamond layer in the direction of the crystal growth. Then, an electric current flows in the diamond particles without crossing the grain boundary, and in turn, the carrier mobility becomes larger. Thereby the radiation detecting element of the present invention has much higher sensitivity than the semiconductor detector comprising the conventional polycrystal diamond.

In view of a collision cross section against radiation, a thickness of the diamond layer is preferably at least 10 μm, more preferably at least 100 μm, in particular, from 200 to 300 μm. In view of production costs, the thickness of the diamond is preferably not larger than 1 mm.

Herein, a direction in which the electric current flows, namely a diamond growing direction is referred to as a "longitudinal direction", and a direction perpendicular to the longitudinal direction is referred to as a "transverse direction".

When a size of the diamond particle of the polycrystal in the transverse direction is to small, it is highly possible that the carriers may cross the grain boundaries obliquely so that the detection sensitivity may be adversely affected even if no grain boundary is present in the longitudinal direction. Therefore, it is preferable that the particle size in the transverse direction is sufficiently large and the smaller number of the grain boundaries are present in the transverse direction. Preferably, the minimum particle size in the transverse direction in the polycrystal is at least 1 μm. A preferred range of the particle size in the transverse direction is from 5 to 50 μm, and an optimum particle size is about 20 μm.

An initial layer formed in the diamond growth by the vapor phase deposition tends to have a small crystal size. In addition, since many defects or unevenness remain at an interface between the diamond layer and a substrate which is used for growing the polycrystal diamond or on a growth surface, they may decrease the sensitivity. To prevent this, both surfaces of the diamond film synthesized by the vapor phase deposition is polished to provide smooth surfaces.

A surface smoothness is preferably not larger than 0.2 $\mu$m, and the surface which contacts the substrate during growing should be polished away by at least 5 $\mu$m.

Alternatively, deactivation of the carriers at the interface between the substrate and the diamond layer or the growth surface can be prevented by doping a sufficient amount of an impurity element during the vapor phase deposition into parts containing many grain boundaries or defects near such interface or growth surface so as to form an electrically conductive diamond layer having a high conductivity, whereby the generation and the movement of the carrier in the diamond semiconductor layer, which relate to the sensitivity and the response speed are separated from each other.

To impart the diamond with conductivity, is used at least one impurity element such as boron, aluminum, lithium, phosphorus, sulfur or selenium. Among them, boron is preferred since it effectively decreases the resistivity with a small amount and does not deteriorate crystallinity of the diamond.

The electrically conductive diamond layer has a thickness of at least 5 $\mu$m.

The semiconductor layer used in the radiation detecting element should have a small dark current and a large resistivity to detect very weak signals. However, the resistivity should not be so high that electric charge is accumulated in the semiconductor layer.

The semiconductor diamond layer has a resistivity of at least $10^7$ $\Omega$.cm, preferably from $10^9$ to $10^{12}$ $\Omega$.cm.

The resistivity of the polycrystal diamond used in the present invention can be controlled by doping a small amount of an impurity during vapor phase deposition. For example, addition of a small amount of boron (B) decreases the resistivity, and addition of a small amount of nitrogen (N) increases the resistivity.

The vapor phase deposition for synthesizing the polycrystal diamond according to the present invention may be any of a plasma CVD (chemical vapor deposition) method, a thermal CVD method comprising heating a thermoelectron radiation material, a combustion flame method, an ion beam method and a laser CVD method.

As a substrate, any material that is resistant to a temperature at which the polycrystal diamond is grown can be used. Preferably, heat resistant materials such as Si, Mo and SiC are used.

As a carbon source, any gaseous compound having a carbon atom such as hydrocarbons (e.g., methane, etc.), alcohols (e.g. methanol, ethanol, isopropanol, etc.), and ketones (e.g. methyl ethyl ketone, etc.) can be used. The carbon source may be diluted with hydrogen gas or an inert gas (e.g. helium, nitrogen, argon, etc.). To improve crystallinity of the diamond, an oxygen-containing gas or a halogen-containing gas may be added.

A method for producing the radiation detecting element of the present invention will be explained by making reference to the accompanying drawings.

FIG. 1 shows a cross section of a substrate, which may be made of Si, Mo or SiC as described above.

Figure 2:
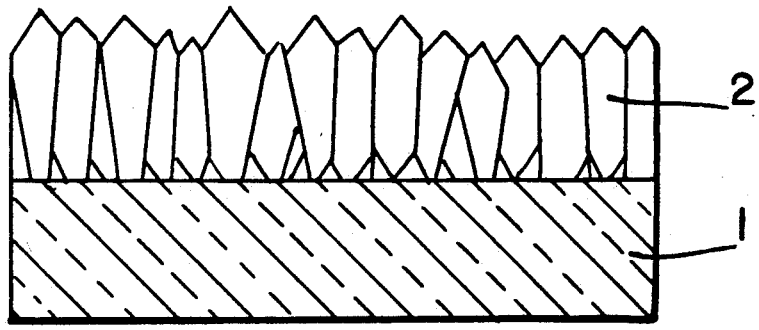
FIG. 2 shows polycrystal diamond particles grown on the substrate.

The polycrystal diamond is grown on the substrate by one of the methods described above. Initially, polycrystal particles which have small particle sizes and tend to form minute grain boundaries are grown. Gradually, pillar-form crystals having no grain boundary in the longitudinal direction are grown. Therefore, the polycrystal layer 2 is grown to a thickness thicker than the necessary thickness as shown in FIG. 2.

Figure 3:
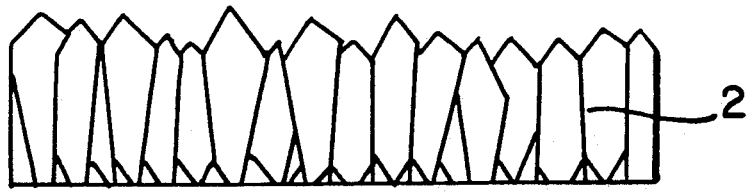
FIG. 3 is a cross section of a polycrystal diamond layer having no substrate.
Figure 4:
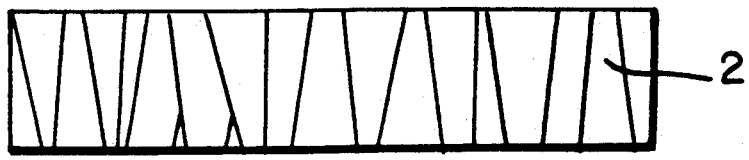
FIG. 4 is a cross section of a polished polycrystal diamond layer.

Then, the substrate 1 is removed to give a film of the polycrystal diamond as shown in FIG. 3. Since the firstly grown lower layer of the film contains many polycrystal particles which are not in the pillar form and the lastly formed top layer contains many defects or unevenness, both surfaces of the diamond layer are polished to obtain the diamond layer having smooth surfaces (see FIG. 4).

As described above, the lower layer which contacted to the substrate should be polished away by at least 5 $\mu$m, and the surface smoothness is preferably not larger than 0.2 $\mu$m.

Figure 5:
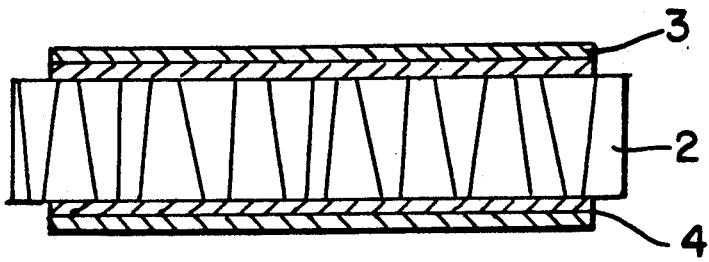
FIG. 5 is a cross section of the radiation detecting element of the present invention comprising the polycrystal diamond layer and a pair of electrodes.

Then, electrodes 3, 4 are formed on the respective surfaces of the diamond layer 2 as shown in FIG. 5. The electrode may be made of Ti or Ni. Since a plane of each electrode is in the transverse direction, the electric current flows through the polycrystal diamond layer without crossing the grain boundaries of the polycrystal. Accordingly, the carrier mobility is large so that the response speed is high.

As illustrated in FIGS. 1 to 5, the pillar-form polycrystal diamond can be grown naturally. Alternatively, the pillar-form polycrystal diamond can be intentionally grown.

Figure 6:
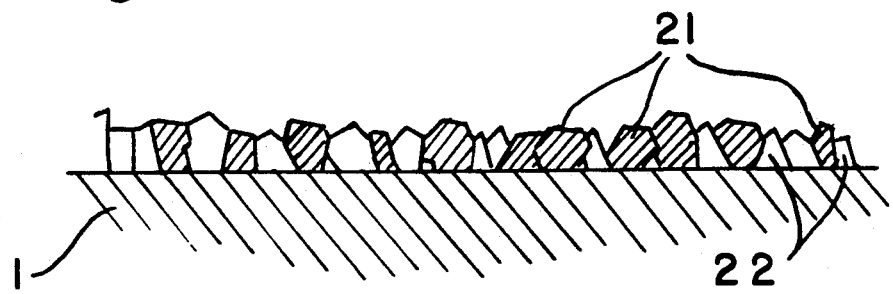
FIG. 6 shows an initial stage of the growth of small diamond particles having various orientations.
Figure 7:
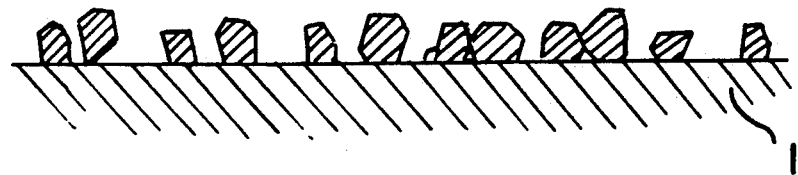
FIG. 7 shows diamond particles having a specific orientation.
Figure 8:
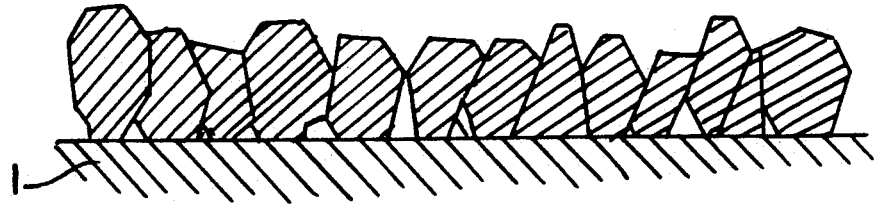
FIG. 8 shows further grown diamond particles having the specific orientation.

As shown in FIG. 6, small particles of the polycrystal diamond are grown on the substrate, and growth of the diamond is stopped. Then, particles 21 having the (100) plane in parallel with the substrate plane (hatched particles) and particles 22 having the (100) plane not in parallel with the substrate plane are distinguished by, for example, X-ray diffraction. Then, the particles not orientated in the (100) plane are selectively removed, for example, by heating in an oxygen atmosphere at a temperature not lower than 300° C., to remain those orientated in the (100) plane as shown in FIG. 7. Thereafter, the diamond crystal is again grown, and only the crystal particles having the (100) plane in parallel with the substrate plane are grown.

Since the diamond particles have the same orientation, they easily have large particle sizes and have no grain boundaries in the longitudinal direction. The subsequent processing steps are the same as above.

The radiation detecting element of the present invention can be used in the same manner as the conventional ones. A suitable voltage is applied between the electrodes. When the radiation irradiates the diamond layer, a current in proportional to the energy of the radiation flows between the electrodes, whereby the presence of the radiation is detected and the energy of the radiation is measured.

Since the diamond has high voltage resistance, the radiation detecting element of the present invention is preferably used at high voltage to increase the response speed. Preferably, an electric field of at least 2000 V/cm is applied in the longitudinal direction of the diamond.

The radiation detecting element of the present invention can detect one or more of the $\alpha$-ray, the $\beta$-ray, the $\gamma$ ray, the X-ray, the neutron and UV light.

PREFERRED EMBODIMENTS OF THE INVENTION

Example 1

A polycrystal silicon piece having a length of 11 mm, a width of 11 mm and a thickness of 1 mm was polished in its growth surface with diamond abrasive grains and used as a substrate. By a conventional microwave plasma CVD, polycrystal diamond was synthesized on the polished surface of the Si substrate.

In the plasma CVD, isopropanol as a carbon source, hydrogen gas and argon were supplied at flow rates of 5 SCCM, 500 SCCM and 100 SCCM, respectively at a microwave (2.45 GHz) output of 700 W under gas pressure of 70 Torr. After 200 hours growth, a diamond film having an average thickness of 580 μm was obtained.

The cross section of the diamond film was polished and grain boundaries were observed with an optical microscope to find that the diamond film consisted of crystals which grown in the pillar-form to a height of 500 μm or larger from the growth surface.

The substrate was removed with an acid, and the growth surface and the interface with the substrate were polished to obtain a diamond film piece having a length of 9 mm, a width of 9 mm and a thickness of 0.45 mm. The surface smoothness on each surface of the diamond film was less than 0.1 μm. By the observation with the optical microscope, it was confirmed that the diamond film consisted of the pillar-form particles having no grain boundary in the longitudinal direction.

The average thickness after polishing was 510 μm. At the interface with the substrate was polished by 12 μm on the average. The surface roughness ($R_{max}$) on both the interface with the substrate and the growth surface was less than 0.1 μm.

On both surfaces of the diamond film, Ni and Ti were successively vapor deposited to form electrodes each having a length of 8 mm and a width of 8 mm. Thereby, a radiation detecting element was produced.

Between the pair of the electrodes of the produced radiation detecting element, a voltage of 300 V was applied. When the γ-ray having an energy of about 4 MeV was detected, a current of 30 μA on the average was measured. The dark current in the absence of the γ-ray was 0.01 μA. This result means that the produced element was highly sensitive.

Figure 9:
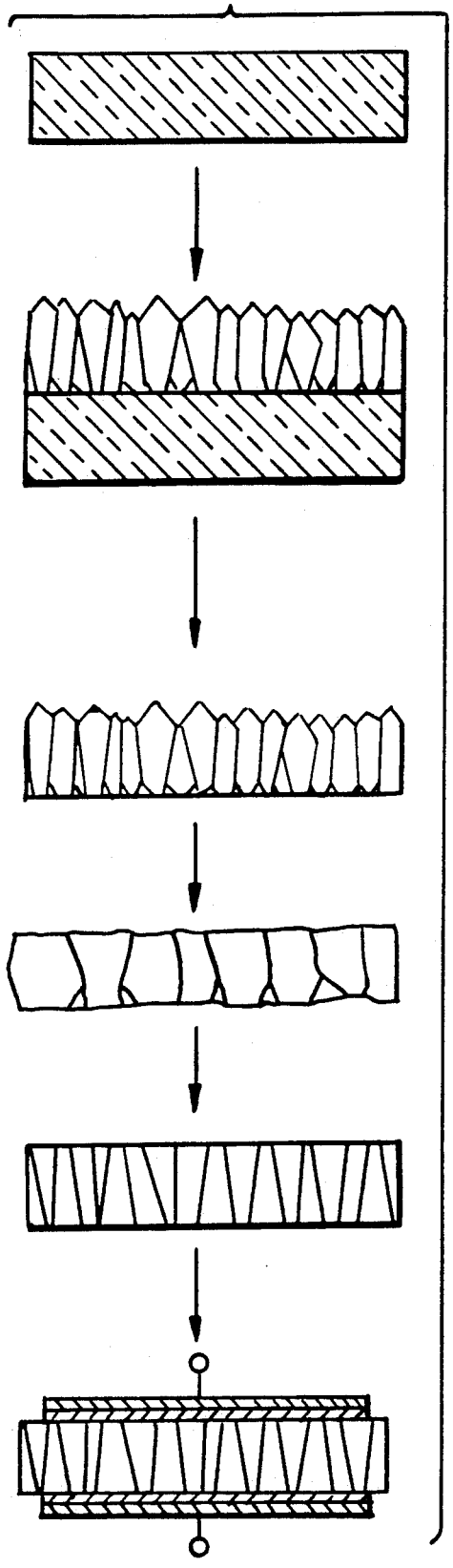
FIGS. 9 and 10 schematically show process steps used in Examples 1 and 2, respectively.
Figure 10:
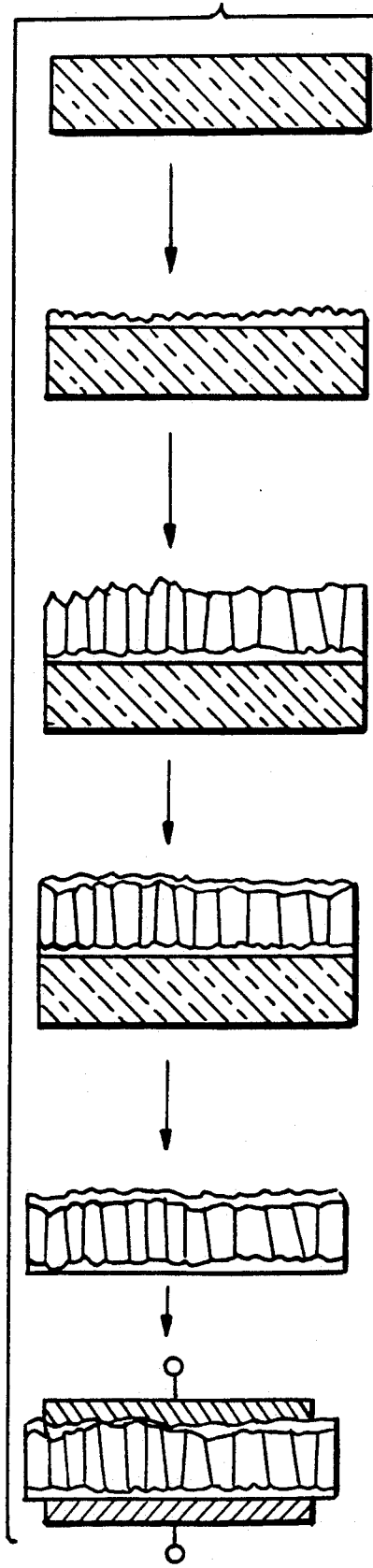

The process steps in Example 1 are shown in FIG. 9.

EXAMPLE 2

An element was produced in substantially the same manner as in Example 1 except that the kind of the conductive layer was changed, conductive boron-doped diamond layers were grown on both surfaces of the semiconductor layer instead of polishing, and diboran diluted to 500 ppm with hydrogen gas was additionally supplied at a flow rate of 5 SCCM during the growth of the conductive layer.

The results are shown in Table. The current value in detecting sensitivity is that after subtraction of the dark current.

TABLE

| Sample No. | Thickness of semi-conductor layer (μm) | Thickness of conductive layer (μm) | | Polish | | Sensitivity (μA) |
|---|---|---|---|---|---|---|
| | | Substrate side | Growth surface side | Substrate side | Growth surface side | |
| 1 | 340 | No | No | No | No | 3 |
| 2 | 300 | No | No | Yes | No | 18 |
| 3 | 320 | No | No | Yes | Yes | 35 |
| 4 | 170 | No | No | Yes | Yes | 39 |
| 5 | 370 | 20 | No | No | No | 22 |
| 6 | 370 | 20 | 30 | No | No | 36 |

According to the present invention, the radiation detecting element having a large area, high sensitivity and a high response speed can be produced economically.

Although the polycrystal diamond is used as a semiconductor layer, since the carriers do not move across the grain boundaries, the carrier mobility is very large so that the radiation detecting element of the present invention has a higher response speed than the conventional radiation detecting element comprising the silicon semiconductor.

Since the semiconductor layer is made of diamond, the radiation detecting element has good resistance to environment. When materials of the electrodes and other parts are suitably selected, the radiation detecting element of the present invention may be used at high temperatures or in a corrosive atmosphere.

The polycrystal diamond is cheaper than a single crystal diamond. While a particle size of the single crystal diamond is not large, the polycrystal diamond film grown on the substrate has a large area so that the radiation detecting element of the present invention has a large area.

What is claimed is:

1. A radiation detecting element comprising a pair of electrode and a semiconductor layer interposed between said pair of electrodes wherein said semiconductor layer comprises a polycrystal diamond having no grain boundary in a direction in which a voltage is applied, and an electric current flows through said semiconductor layer from one electrode to the other without crossing a grain boundary.

2. The radiation detecting element according to claim 1, wherein said semiconductor layer comprising the polycrystal diamond has a thickness of at least 10 μm.

3. The radiation detecting element according to claim 1, wherein said semiconductor layer comprising the polycrystal diamond has a thickness of from 200 to 300 μm.

4. The radiation detecting element according to claim 1, wherein said semiconductor layer comprising the polycrystal diamond has a surface smoothness of not larger than 0.2 μm.

5. The radiation detecting element according to claim 1, which further comprises a conductive diamond layer on at least one surface of said semiconductor layer, and wherein said electrode is formed on said conductive diamond layer.

6. A method for producing a radiation detecting element including a pair of electrodes and a semiconductor diamond layer interposed between said pair of electrodes, the method comprising the steps of: growing said semiconductor diamond layer on a substrate, removing said substrate, and forming said electrodes.

7. The method according to claim 6, which further comprises polishing at least one surface of said semiconductor diamond layer by at least 5 μm.

8. The method according to claim 6, wherein a conductive diamond layer is formed on said semiconductor diamond layer by growing said conductive diamond layer by vapor phase deposition from a raw material gas containing at least carbon and boron.

* * * * *